(12) United States Patent
Liang et al.

(10) Patent No.: US 9,661,584 B2
(45) Date of Patent: May 23, 2017

(54) UPLINK POWER CONTROL METHOD, BASE STATION AND USER EQUIPMENT

(71) Applicant: Huawei Technologies Co., Ltd., Shenzhen, Guangdong (CN)

(72) Inventors: Yongming Liang, Shanghai (CN); Wei Ni, Shenzhen (CN); Jiming Chen, Shenzhen (CN); Xiaotao Ren, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 240 days.

(21) Appl. No.: 14/164,938

(22) Filed: Jan. 27, 2014

(65) Prior Publication Data

US 2014/0141832 A1 May 22, 2014

Related U.S. Application Data

(63) Continuation of application No. PCT/CN2011/077956, filed on Aug. 3, 2011.

(51) Int. Cl.
| | |
|---|---|
| *H04B 1/00* | (2006.01) |
| *H04B 7/00* | (2006.01) |
| *H04W 52/24* | (2009.01) |
| *H04W 52/14* | (2009.01) |
| *H04W 52/46* | (2009.01) |

(Continued)

(52) U.S. Cl.
CPC ....... *H04W 52/242* (2013.01); *H04W 52/146* (2013.01); *H04W 52/46* (2013.01); *H04W 52/10* (2013.01); *H04W 52/40* (2013.01)

(58) Field of Classification Search
CPC ........... H04W 52/146; H04W 52/0235; H04W 52/245; H04W 52/60; H04W 88/08;
(Continued)

(56) References Cited

U.S. PATENT DOCUMENTS

| 6,442,398 B1 * | 8/2002 | Padovani ............ H04W 52/283 455/453 |
| 2002/0168994 A1 | 11/2002 | Terry et al. |

(Continued)

FOREIGN PATENT DOCUMENTS

| CN | 1846364 A | 10/2006 |
| EP | 2 104 247 A1 | 9/2009 |

(Continued)

OTHER PUBLICATIONS

Application International Search Report. Aug. 3, 2011.*
English translation of Application—Written Opinion of the International Search Aug. 3, 2011.*

*Primary Examiner* — Shaima Q Aminzay

(57) ABSTRACT

A method includes: sending, by a user equipment (UE), uplink test signaling to transceivers for serving the UE, so that the transceivers calculate receive power of the uplink test signaling by testing the uplink test signaling; receiving, by the UE, the receive power of the uplink test signaling and transmit power of a common reference signal (CRS) from the transceivers; receiving and testing, by the UE, the CRS sent by the transceivers to obtain receive power of the CRS; calculating, by the UE, uplink path losses on paths between the UE and the transceivers according to the receive power of the uplink test signaling, the transmit power of the CRS, and the receive power of the CRS; calculating, by the UE, an aggregate path loss according to the uplink path losses on paths between the UE and the transceivers; and calculating, by the UE, uplink transmit power according to the aggregate path loss.

23 Claims, 6 Drawing Sheets

(51) Int. Cl.
*H04W 52/10* (2009.01)
*H04W 52/40* (2009.01)

(58) Field of Classification Search
CPC ..... H04W 52/04; H04W 52/08; H04W 52/10; H04W 52/325
USPC ............. 455/69, 68, 70, 67.11, 67.12, 67.13, 455/67.14, 522, 574; 370/235, 318, 310
See application file for complete search history.

(56) References Cited

U.S. PATENT DOCUMENTS

| | | |
|---|---|---|
| 2003/0153344 A1 | 8/2003 | Su et al. |
| 2005/0143121 A1 | 6/2005 | Huh et al. |
| 2006/0183495 A1 | 8/2006 | Soliman |
| 2007/0054690 A1* | 3/2007 | Wu ....................... H04W 52/08 455/522 |
| 2008/0045157 A1* | 2/2008 | Takahashi ........... H04L 43/0876 455/67.11 |
| 2008/0207250 A1 | 8/2008 | Park et al. |
| 2010/0331036 A1 | 12/2010 | You et al. |

FOREIGN PATENT DOCUMENTS

| | | |
|---|---|---|
| RU | 2327289 C2 | 6/2008 |
| RU | 2395164 C1 | 7/2010 |
| WO | WO 2008/109162 A2 | 9/2008 |
| WO | WO 2010/035966 A2 | 4/2010 |

* cited by examiner

UPLINK POWER CONTROL METHOD, BASE STATION AND USER EQUIPMENT

CROSS-REFERENCE TO RELATED APPLICATIONS

This application is a continuation of International Application No. PCT/CN2011/077956, filed on Aug. 3, 2011, which is hereby incorporated by reference in its entirety.

TECHNICAL FIELD

Embodiments of the present invention relate to the field of network communication technologies, and in particular, to an uplink power control method, a base station, and a user equipment.

BACKGROUND

In a 3rd Generation Partnership Project (3GPP, 3rd Generation Partnership Project) radio access network (RAN, Radio Access Network) technology of a cellular communication system, four coordinated multi-point transmission (CoMP, Coordinated Multi-Point Transmission) scenarios are defined. In a third CoMP scenario (briefly known as CoMP solution 3), a cell identity (Cell Identity) is allocated to each RRH at a transmission point of a transceiver, that is, a base station or a radio remote head (RRH, Radio Remote Head), in the area of a macro site. Such a structure is similar to a system where multiple base stations coexist. However, in a fourth CoMP scenario (briefly known as CoMP solution 4), the same cell identity is shared by all transmission points of a transceiver, that is, a base station or a radio remote head, in the area of a macro site. Such an architecture is also called a distributed antenna system (DAS, Distributed Antenna System).

In an existing relevant standard, a real-life multiple-input multiple-output (Real-life Multiple-Input Multiple-Output) antenna configuration scenario is defined, that is, one user equipment (UE, User Equipment) may be combined with one or more antennas of transceivers located in different geographic positions to form a MIMO system, thereby implementing a distributed downlink or uplink MIMO system.

In uplink transmission of a DAS system and a system similar to a system where multiple base stations coexist, uplink power control is generally applied to a UE to achieve roughly the same level of the receive power when different types of user equipments arrive at a base station (BS, Base Station), so as to avoid interference between users caused by a near-far effect. In a 3GPP Long Term Evolution (LTE, Long Term Evolution) Release-10 standard, the transmit power of a physical uplink shared channel (PUSCH, Physical Uplink Shared Channel), a physical uplink control channel (PUCCH, Physical Uplink Control Channel), and an uplink sounding reference signal (SRS, Sounding Reference Signal) is determined by a path loss (PL, Path Loss) estimated by the UE, as expressed by the following formula:

$$PL_c = \text{referenceSignalPower} - RSRP$$

where, referenceSignalPower is reference signal power defined for the base station, and is obtained by the UE by receiving or sensing cell-based higher layer signaling (Higher layer signaling) sent by the base station, and RSRP is reference signal receive power measured by the UE at a common reference signal (CRS, Common Reference Signal) port (Port0 or Port1).

However, the existing PL calculation method can only be used for calculating a path loss from the user equipment to one base station, and cannot be used for calculating a path loss from the user equipment to multiple transceivers.

Three uplink power control solutions in a CoMP system have been put forward in the prior art: Solution 1 is a PL compensation solution based on a current serving cell, solution 2 is a maximum value solution based on a CoMP receiving point, and solution 3 is a solution based on a nonlinear averaging method. Without fully considering a path condition of each of multiple uplink power transmission points, solutions 1, 2, and 3 are incapable of calculating a path loss of multiple uplink power transmission points accurately, and are therefore incapable of performing accurate uplink power control.

In addition, a CRS-based open-loop power control (OLPC, Open-loop power control) solution exists in the prior art. The uplink path loss obtained by using the CRS-based open-loop power control solution is not accurate enough, and therefore, this solution is incapable of performing accurate uplink power control.

In the process of implementing the present invention, the inventor of the present invention finds that the uplink actual receiving point may be inconsistent with the downlink actual receiving point, and therefore, the path loss calculation varies between the uplink and the downlink. The existing CoMP solutions 3 and 4 and the PL calculation method for a real-life MIMO system can only be used for calculating the path loss from the user equipment to one base station, and cannot be used for calculating the path loss from the user equipment to multiple base stations or RRHs. Moreover, in a communication system equipped with one or more RRHs, multiple paths exist in both downlink transmission and uplink transmission, which makes the uplink path loss calculation rather complicated. None of the existing solutions is capable of calculating the uplink path loss accurately. Therefore, it is necessary to work out an uplink power control method for calculating the path loss of multiple uplink paths and controlling uplink power.

SUMMARY

Embodiments of the present invention provide an uplink power control method, a base station, and a user equipment to implement uplink power control in a case of multiple paths and flexibly support transceivers engaged in uplink joint reception.

An embodiment of the present invention provides an uplink power control method, including:

sending, by a user equipment, uplink test signaling to transceivers for serving the user equipment, so that the transceivers calculate receive power of the uplink test signaling by testing the uplink test signaling;

receiving, by the user equipment, the receive power of the uplink test signaling and transmit power of a common reference signal from the transceivers, where the transmit power of the common reference signal is transmit power of a CRS sent by the transceivers to the user equipment;

receiving and testing, by the user equipment, the CRS sent by the transceivers to obtain receive power of the reference signal;

calculating, by the user equipment, uplink path losses on paths between the user equipment and the transceivers according to the receive power of the uplink test signaling, the transmit power of the common reference signal, and the receive power of the reference signal;

calculating, by the user equipment, an aggregate path loss according to the uplink path losses on paths between the user equipment and the transceivers; and calculating, by the user equipment, uplink transmit power according to the aggregate path loss.

Other embodiments provide similar methods, a base station, transceiver in the station and a UE which can execute the methods.

As seen from the above technical solutions, the embodiments of the present invention have the following advantages:

In the embodiments of the present invention, a user equipment sends uplink test signaling to transceivers for serving the user equipment; the user equipment may receive power of the uplink test signaling and transmit power of a common reference signal from the transceivers; and then the user equipment receives and tests the common reference signal sent by the transceivers to obtain receive power of the reference signal, calculates uplink path losses on paths between the user equipment and the selected transceivers according to the receive power of the uplink test signaling, the transmit power of the common reference signal, and the receive power of the reference signal, calculates an aggregate path loss according to the uplink path loss, and finally is capable of calculating uplink transmit power according to the aggregate path loss. Because the uplink path losses on paths between the user equipment and the selected transceivers is used for calculating the aggregate path loss, the user equipment can calculate the uplink transmit power more precisely. Because the transceivers for serving the user equipment may be selected by the base station, transceivers engaged in uplink joint reception can be supported flexibly, and the user equipment can calculate the uplink transmit power more precisely.

DETAILED DESCRIPTION

Embodiments of the present invention provide an uplink power control method, a base station, and a user equipment to implement uplink power control in a case of multiple paths and flexibly support transceivers engaged in uplink joint reception.

Figure 1:
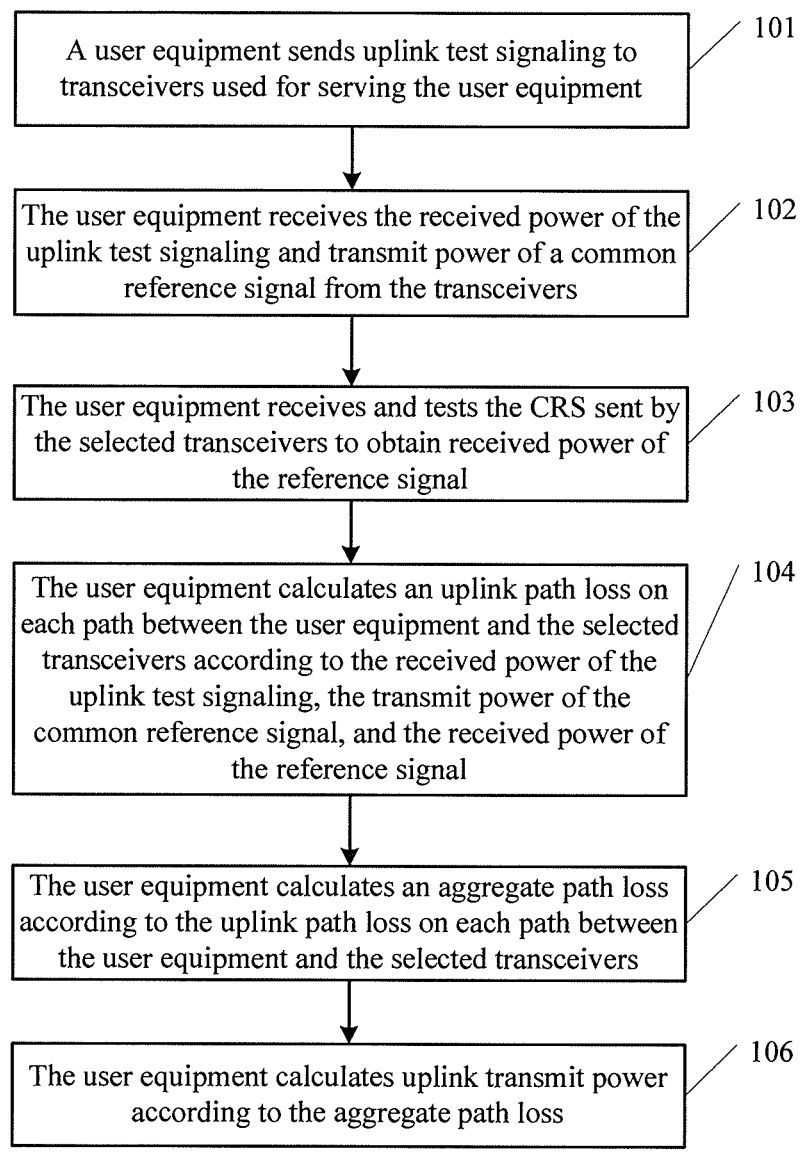
FIG. 1 is a schematic diagram of an uplink power control method according to an embodiment of the present invention.

As shown in FIG. 1, an uplink power control method provided in an embodiment of the present invention includes:

101. A user equipment sends uplink test signaling to transceivers for serving the user equipment.

Figure 2:
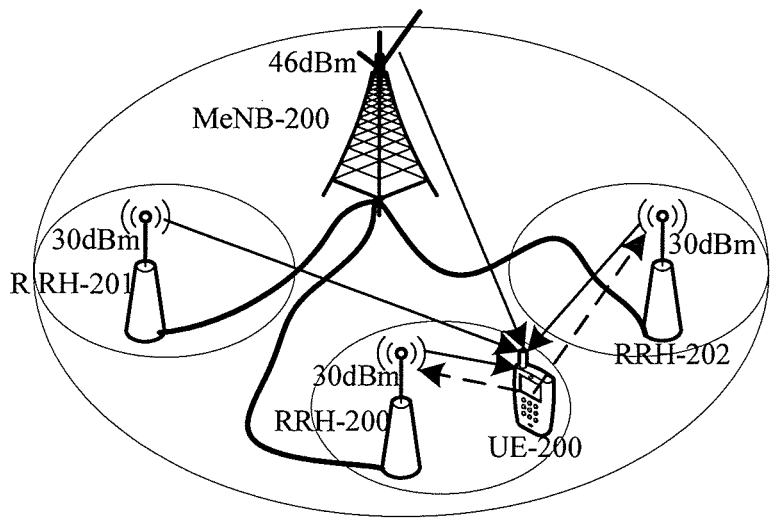
FIG. 2 is a schematic architecture diagram of joint communication of a base station and RRHs in a heterogeneous network according to an embodiment of the present invention.

In the embodiment of the present invention, multiple RRHs need to be configured properly according to the geographic location of a base station in the network planning to accomplish coverage for specific geographic areas. A transceiver may be specifically a base station or an RRH or a relay (relay), or the like, in the area where the user equipment is located. Optionally, in the embodiment of the present invention, one transceiver or more than two transceivers may be included. As shown in FIG. 2, a base station MeNB (Macro eNodeB)-200 with the transmit power of 46 dBm and multiple RRHs (RRH-200, RRH-201, and RRH-202) make up a communication system; the base station MeNB-200, the RRH-200, the RRH-201, and the RRH-202 participate in downlink transmission with the UE-200, but in the uplink, only the RRH-200 and the RRH-202 participate in the uplink transmission with the UE-200. In FIG. 2, the connections between the MeNB-200 and the multiple RRHs (RRH-200, RRH-201, RRH-202, and RRH-203) may be specifically backhaul (Backhaul) connections; the connection medium may be an optical fiber (Fiber), a copper cable (Copper), a microwave medium (Microwave), and so on. In the embodiment of the present invention, the transmission delays between the base station MeNB and the RRHs are so small that the transmission delays are ignorable, and it is deemed that the data exchange between the MeNB and the RRHs is completed instantaneously. It should be noted that the connection between the MeNB and the RRHs will be omitted in subsequent diagrams in order to clearly illustrate the interaction process between the UE and the MeNB and RRHs.

In the embodiment of the present invention, the base station selects transceivers for serving the user equipment. In actual applications, the base station may select a base station, or an RRH, or multiple RRHs, or a base station and an RRH, or a base station and multiple RRHs, for the user equipment. When the base station selects a base station or an RRH for the user equipment, reference may be made to the practice in the prior art, or the method provided in the embodiment of the present invention may be used, and the details will not be described herein again. The embodiment of the present invention deals with the following cases: The base station selects multiple RRHs, or a base station and an RRH, or a base station and multiple RRHs, for the user equipment. When the base station selects transceivers for the user equipment, the base station may, according to a specific condition of each user equipment in the coverage area, decide which transceivers will be selected for serving the user equipment. For example, according to a measurement report and channel state information of the user equipment, the base station selects transceivers for serving the user equipment.

The method embodiment illustrated in FIG. 1 is implemented on the user equipment side, and the method implemented on the base station side will be given in subsequent embodiments. In the embodiment of the present invention, the user equipment sends uplink test signaling to the transceivers selected by the base station for serving the user equipment. The uplink test signaling may be specifically physical random access channel (PRACH, Physical Random Access Channel) signaling or uplink aperiodic sounding reference signal (A-SRS, Aperiodic Sounding Reference Signal) signaling, and so on. By testing the uplink test signaling sent by the user equipment, the transceivers can obtain the receive power of the uplink test signaling received by the transceivers.

102. The user equipment receives the receive power of the uplink test signaling and transmit power of a common reference signal from the transceivers.

The receive power of the uplink test signaling is the receive power of the uplink test signaling received by the selected transceivers, and the transmit power of the common reference signal is transmit power of a common reference signal (CRS, Common Reference Signal) sent by the selected transceivers to the user equipment.

In the embodiment of the present invention, after the user equipment sends uplink test signaling to the transceivers selected by the base station for serving the user equipment, the selected transceivers receive the uplink test signaling. With the uplink test signaling, the base station may measure the receive power of the uplink test signaling received by the selected transceivers, and the base station sends the receive power of the uplink test signaling to the user equipment. In the embodiment of the present invention, the selected transceivers send a common reference signal to the user equipment, where the transmit power of the common reference signal sent by each selected transceiver to the user equipment may be the same or different, and the base station sends the transmit power of the common reference signals to the user equipment. It should be noted that the value of the transmit power of each selected transceiver may be the same or different. If the base station selects different transceivers, the receive power of the uplink test signaling and the transmit power of the common reference signal sent by the base station also vary.

103. The user equipment receives and tests the CRS sent by the selected transceivers to obtain receive power of the reference signal.

In the embodiment of the present invention, the selected transceivers send the CRS to the user equipment respectively, and the user equipment may receive and test the CRS to obtain the receive power of the reference signal. A feasible implementation manner is: On port 0 or port 1, the user equipment may receive and test the CRS sent by the selected transceivers to obtain the receive power of the reference signal. The method of obtaining the power of the reference signal by testing the CRS is covered in the prior art, and is not detailed herein.

104. The user equipment calculates uplink path losses on paths between the user equipment and the selected transceivers according to the receive power of the uplink test signaling, the transmit power of the common reference signal, and the receive power of the reference signal.

After the receive power of the uplink test signaling and the transmit power of the common reference signal are obtained by performing section 102 and the receive power of the reference signal is obtained by measurement by performing section 103, the user equipment calculates uplink path losses on paths between the user equipment and the selected transceivers according to the receive power of the uplink test signaling, the transmit power of the common reference signal, and the receive power of the reference signal. That is, the user equipment calculates the uplink path losses on paths among uplink links of the user equipment. In the embodiment of the present invention, the path loss of each transceiver engaged in the uplink joint reception can be calculated. Through precise calculation of the loss of each path, the precision of the uplink power control performed by the user equipment is ensured. In subsequent embodiments of the present invention, the detailed implementation manner of calculating the uplink path losses on paths between the user equipment and the selected transceivers will be given for reference.

In the embodiment of the present invention, the calculating, by the user equipment, uplink path losses on paths between the user equipment and the selected transceivers according to the receive power of the uplink test signaling, the transmit power of the common reference signal, and the receive power of the reference signal, may specifically include:

calculating (N−1) first relative ratios, where the first relative ratio is a ratio of the receive power of the uplink test signaling received by any transceiver in the selected transceivers to the receive power of the uplink test signaling received by another transceiver in the selected transceivers, and N is the number of selected transceivers and is a natural number greater than 1; calculating (N−1) second relative ratios according to the (N−1) first relative ratios, where the second relative ratio is a ratio of the uplink path loss on a path between the user equipment and any transceiver in the selected transceivers to the uplink path loss on a path between the user equipment and another transceiver in the selected transceivers; and calculating the uplink path losses on paths between the user equipment and the selected transceivers according to the receive power of the reference signal, the (N−1) second relative ratios, and the transmit power of the common reference signal.

The calculation is described below: After the receive power, of the uplink test signaling, sent by the base station is received by performing section 102, the receive power of the uplink test signaling received by any transceiver in the selected transceivers is divided by the receive power of the uplink test signaling received by another transceiver in the selected transceivers to obtain a first relative ratio, and the (N−1) first relative ratios can be calculated in total in the same way. The (N−1) second relative ratios are calculated according to the (N−1) first relative ratios, as detailed below: The uplink path loss on a path between the user equipment and any transceiver in the selected transceivers is divided by the uplink path loss on a path between the user equipment and another transceiver in the selected transceivers to obtain a second relative ratio, and the (N−1) second relative ratios can be calculated in total in the same way.

105. The user equipment calculates an aggregate path loss according to the uplink path losses on paths between the user equipment and the selected transceivers.

In the embodiment of the present invention, after calculating the uplink path losses on paths between the user equipment and the selected transceivers, the user equipment calculates an aggregate path loss according to the uplink path losses on paths. The aggregate path loss may be calculated in many ways. For example, the uplink path losses on all paths directly add up to an aggregate path loss, or a maximum value of the uplink path losses on all paths is used as an aggregate path loss, or the uplink path losses on all paths are weighted and then the sum thereof is used as an aggregate path loss, or the uplink path losses on all paths undergo a nonlinear operation, and a result of the nonlinear operation is used as an aggregate path loss. Anyway, the calculation method may be selected flexibly according to the specific application scenario, and is not limited herein.

106. The user equipment calculates uplink transmit power according to the aggregate path loss.

After the aggregate path loss is obtained by performing section 105, the user equipment may calculate uplink transmit power according to the aggregate path loss.

In the LTE Release-10 standard, the user equipment may specifically send data or signaling by using a PUSCH mode, a PUCCH mode, or an SRS mode, and the transmit power is decided by the aggregate path loss calculated by the user equipment.

In the embodiment of the present invention, a user equipment sends uplink test signaling to transceivers for serving the user equipment; the user equipment may receive power of the uplink test signaling and transmit power of a common reference signal from the transceivers; and then the user equipment receives and tests the common reference signal sent by the transceivers to obtain receive power of the reference signal, calculates uplink path losses on paths between the user equipment and the selected transceivers according to the receive power of the uplink test signaling, the transmit power of the common reference signal, and the receive power of the reference signal, calculates an aggregate path loss according to the uplink path loss, and finally is capable of calculating uplink transmit power according to the aggregate path loss. Because the uplink path losses on paths between the user equipment and the selected transceivers is used for calculating the aggregate path loss, the user equipment can calculate the uplink transmit power more precisely. Because the transceivers for serving the user equipment may be selected by the base station, transceivers engaged in uplink joint reception can be supported flexibly, and the user equipment can calculate the uplink transmit power more precisely.

Figure 3:
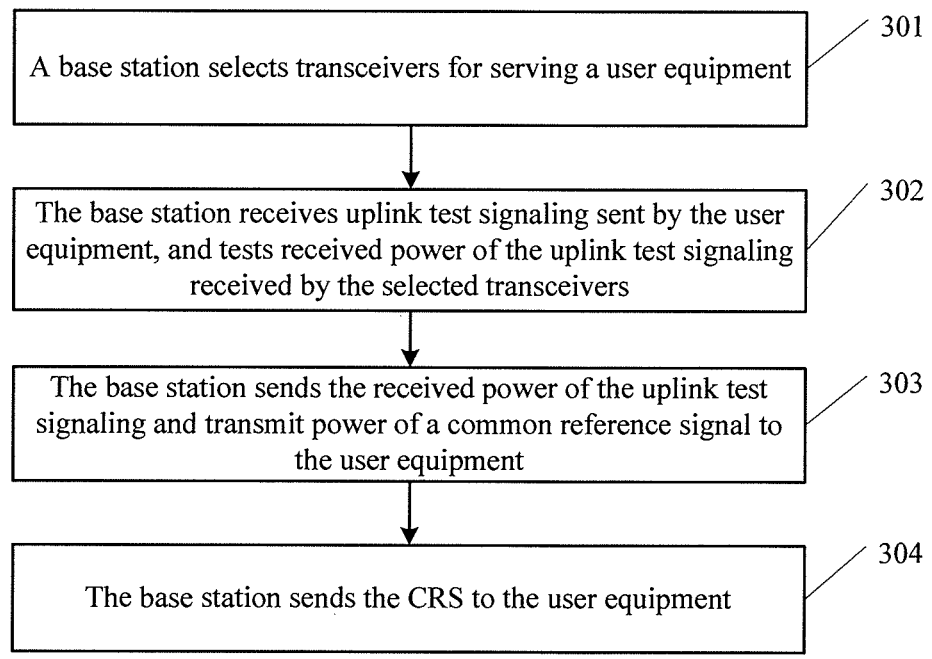
FIG. 3 is a schematic diagram of another uplink power control method according to an embodiment of the present invention.

The above embodiment describes an uplink power control method implemented on the user equipment side, and the following describes an uplink power control method implemented on the base station side, as shown in FIG. 3.

301. A base station selects transceivers for serving a user equipment.

In the embodiment of the present invention, the base station selects transceivers for serving the user equipment first. In actual applications, the base station may select base stations or RRHs as transceivers for the user equipment, and the base station may select a base station, or an RRH, or multiple RRHs, or a base station and an RRH, or a base station and multiple RRHs, for the user equipment. When the base station selects a base station or an RRH for the user equipment, reference may be made to the practice in the prior art, or the method provided in the embodiment of the present invention may be used, and the details will not be described herein again. The embodiment of the present invention deals with the following cases: The base station selects multiple RRHs, or a base station and an RRH, or a base station and multiple RRHs, for the user equipment, which will be described respectively. When the base station selects transceivers for the user equipment, the base station may, according to a specific condition of each user equipment in the coverage area, decide which transceivers will be selected for serving the user equipment. For example, according to a measurement report and channel state information of the user equipment, the base station selects transceivers for serving the user equipment.

It should be noted that in actual applications, the transceivers selected for serving the user equipment may share a same Cell identity, which may be applied, for example, in a scenario of CoMP solution 4 of 3GPP RAN1. The transceivers selected for serving the user equipment may also use respective cell identities independently, which may be applied, for example, in a scenario of CoMP solution 3 of 3GPP RAN1.

302. The base station receives uplink test signaling sent by the user equipment, and tests receive power of the uplink test signaling received by the selected transceivers.

In the embodiment of the present invention, the user equipment sends uplink test signaling to the transceivers selected by the base station for serving the user equipment, where the uplink test signaling may be specifically PRACH signaling or A-SRS signaling; the base station may receive the PRACH signaling or A-SRS signaling sent by the user equipment, and test the receive power of the uplink test signaling received by the selected transceivers.

In the embodiment of the present invention, the user equipment sends uplink test signaling to the transceivers selected by the base station for serving the user equipment; after receiving the uplink test signaling, the base station may measure, with the uplink test signaling, the receive power of the uplink test signaling received by the selected transceivers. The method of measuring the receive power of the uplink test signaling received by the transceivers is covered in the prior art, and is not detailed herein.

303. The base station sends the receive power of the uplink test signaling and transmit power of a common reference signal to the user equipment.

The receive power of the uplink test signaling is receive power of the uplink test signaling received by the selected transceivers, and the transmit power of the common reference signal is transmit power of the common reference signal sent by the selected transceivers to the user equipment.

In the embodiment of the present invention, with the uplink test signaling, the base station may measure the receive power of the uplink test signaling received by the selected transceivers, and send the receive power of the uplink test signaling to the user equipment. In the embodiment of the present invention, the selected transceivers send a common reference signal to the user equipment, where the transmit power of the common reference signal sent by each selected transceiver to the user equipment may be the same or different, and the base station sends the transmit power of the common reference signals to the user equipment. It should be noted that the value of the transmit power of each selected transceiver may be the same or different. If the base station selects different transceivers, the receive power of the uplink test signaling and the transmit power of the common reference signal sent by the base station also vary. In addition, to reduce the processing load of the user equipment, the sending, by the base station, the receive power of the uplink test signaling received by the selected transceivers and transmit power of a common reference signal to the user equipment may specifically be as follows:

The base station calculates (N−1) first relative ratios, where the first relative ratio is a ratio of the receive power of the uplink test signaling received by any transceiver in the selected transceivers to the receive power of the uplink test signaling received by another transceiver in the selected transceivers, and N is the number of selected transceivers and is a natural number greater than 1.

The base station calculates (N−1) second relative ratios according to the (N−1) first relative ratios, where the second relative ratio is a ratio of the uplink path loss on a path between the user equipment and any transceiver in the selected transceivers to the uplink path loss on a path between the user equipment and another transceiver in the selected transceivers.

The base station sends the (N−1) second relative ratios and the transmit power of the common reference signal to the user equipment.

In actual applications, the base station may use higher layer signaling such as radio resource control (RRC, Radio Resource Control) protocol signaling to send the receive power of the uplink test signaling received by the selected transceivers and the transmit power of the common reference signal to the user equipment.

304. The base station sends the CRS to the user equipment.

In the embodiment of the present invention, the base station sends the CRS to the user equipment, and the user equipment may receive and test the CRS sent by the selected transceivers to obtain the receive power of the reference signal. A feasible implementation manner is: The selected transceivers may send the CRS at port 0, or the selected transceivers may send the CRS at port 1, where the method of sending the CRS to the user equipment by the base station is covered in the prior art, and is not detailed herein.

In the embodiment of the present invention, the transceivers selected by the base station for serving the user equipment receive the uplink test signaling sent by the user equipment, and then the base station sends the receive power of the uplink test signaling received by the selected transceivers and the transmit power of the common reference signal to the user equipment, and finally, the selected transceivers send the CRS to the user equipment. The user equipment may receive and test the common reference signal to obtain receive power of the reference signal; the user equipment may calculate uplink path losses on paths between the user equipment and the selected transceivers according to the receive power of the uplink test signaling, the transmit power of the common reference signal, and the receive power of the reference signal, calculate an aggregate path loss according to the uplink path loss, and finally, calculate uplink transmit power according to the aggregate path loss. Because the uplink path losses on paths between the user equipment and the selected transceivers is used for calculating the aggregate path loss, the user equipment can calculate the uplink transmit power more precisely. Because the transceivers for serving the user equipment may be selected by the base station, transceivers engaged in uplink joint reception can be supported flexibly, and the user equipment can calculate the uplink transmit power more precisely.

The following describes how a transceiver selected by a base station interacts with a user equipment to implement an uplink power control of the user equipment, where the transceiver may be specifically a base station or an RRH. When the transceiver is a selected base station, the method illustrated in FIG. 4 deals with interaction between the selected base station and the user equipment in the following way; when the transceiver is a selected RRH, the interaction with the user equipment may be implemented in the same way as that illustrated in FIG. 4.

401. A base station receives uplink test signaling sent by a user equipment, and tests receive power of the uplink test signaling received by the base station.

In the embodiment of the present invention, the base station is a transceiver selected for serving the user equipment. It should be noted that in actual applications, as a transceiver selected for serving the user equipment, the base station may share a same cell identity with an RRH, which may be applied, for example, in a scenario of CoMP solution 4 of 3GPP RAN1. As a transceiver selected for serving the user equipment, the base station may also independently use a cell identity different from that of the RRH, which may be applied, for example, in a scenario of CoMP solution 3 of 3GPP RAN1.

In the embodiment of the present invention, the user equipment sends uplink test signaling to the base station, where the uplink test signaling may be specifically PRACH signaling or A-SRS signaling; the base station may receive the PRACH signaling or A-SRS signaling sent by the user equipment, and test the receive power of the uplink test signaling received by the base station.

In the embodiment of the present invention, the user equipment sends uplink test signaling to the base station; after receiving the uplink test signaling, the base station may measure the receive power of the uplink test signaling with the uplink test signaling. The method of measuring the receive power of the uplink test signaling received by the transceiver is covered in the prior art, and is not detailed herein.

402. The base station sends the receive power of the uplink test signaling and transmit power of a common reference signal to the user equipment.

The receive power of the uplink test signaling is receive power of the uplink test signaling received by the base station, and the transmit power of the common reference signal is transmit power of the common reference signal sent by the base station to the user equipment.

In the embodiment of the present invention, with the uplink test signaling, the base station may measure the receive power of the uplink test signaling received by the base station, and send the receive power of the uplink test signaling to the user equipment. In the embodiment of the present invention, the base station sends a common reference signal to the user equipment. When a different base station is selected, the transmit power of the common reference signal sent to the user equipment may be the same or different. In addition, to reduce the processing load of the user equipment, the sending, by the base station, the receive power of the uplink test signaling and transmit power of a common reference signal to the user equipment may specifically include the following:

The base station calculates (N−1) first relative ratios, where the first relative ratio is a ratio of the receive power of the uplink test signaling received by any transceiver in the selected transceivers to the receive power of the uplink test signaling received by another transceiver in the selected transceivers, and N is the number of selected transceivers and is a natural number greater than 1.

The base station calculates (N−1) second relative ratios according to the (N−1) first relative ratios, where the second relative ratio is a ratio of the uplink path loss on a path between the user equipment and any transceiver in the selected transceivers to the uplink path loss on a path between the user equipment and another transceiver in the selected transceivers.

The base station sends the (N−1) second relative ratios and the transmit power of the common reference signal to the user equipment.

In actual applications, the base station may use higher layer signaling such as radio resource control protocol signaling to send the receive power of the uplink test signaling received by the selected transceivers and the transmit power of the common reference signal to the user equipment.

403. The base station sends the CRS to the user equipment.

In the embodiment of the present invention, the base station sends the CRS to the user equipment, and the user equipment may receive and test the CRS sent by the base station to obtain the receive power of the reference signal. A feasible implementation manner is: The base station may send the CRS at port 0, or the base station may send the CRS at port 1, where the method of sending the CRS to the user equipment by the base station is covered in the prior art, and is not detailed herein.

In the embodiment of the present invention, the selected base station receives the uplink test signaling sent by the user equipment, and then the base station sends the receive power of the uplink test signaling and the transmit power of the common reference signal to the user equipment, and finally, the base station sends the CRS to the user equipment. The user equipment may receive and test the common reference signal to obtain receive power of the reference signal; the user equipment may calculate uplink path losses on paths between the user equipment and the selected transceivers according to the receive power of the uplink test signaling, the transmit power of the common reference signal, and the receive power of the reference signal, calculate an aggregate path loss according to the uplink path loss, and finally, calculate uplink transmit power according to the aggregate path loss. Because the uplink path losses on paths between the user equipment and the selected transceivers is used for calculating the aggregate path loss, the user equipment can calculate the uplink transmit power more precisely. Because the transceivers for serving the user equipment may be selected by the base station, transceivers engaged in uplink joint reception can be supported flexibly, and the user equipment can calculate the uplink transmit power more precisely.

Figure 5:
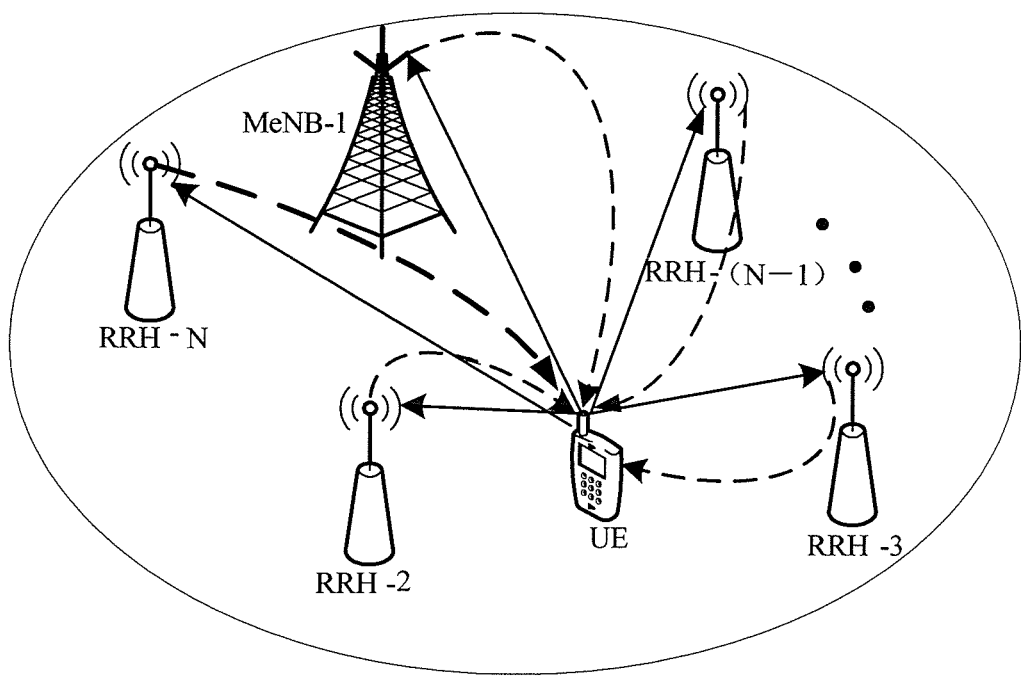
FIG. 5 is a schematic architecture diagram of joint communication of a base station and RRHs in another heterogeneous network according to an embodiment of the present invention.

The following uses an actual application scenario to describe an uplink power control method provided in an embodiment of the present invention. FIG. 5 is a schematic diagram of joint communication of a base station and RRHs in a heterogeneous network. In a communication system in a scenario of CoMP solution 4 in which a same cell identity is shared, it is assumed that the uplink signaling is PRACH signaling. To clearly describe the interaction process between the UE, the MeNB, and multiple RRHs, the connections between the MeNB and the RRHs are omitted in FIG. 5. The connections between MeNB-1 and the RRHs (RRH-2, RRH-3, . . . , and RRH-N) are not illustrated in FIG. 5. However, in actual applications, the connections between the MeNB and the RRHs may be specifically backhaul (Backhaul) connections; the connection medium may be an optical fiber (Fiber), a copper cable (Copper), a microwave medium (Microwave), and so on. In the embodiment of the present invention, the transmission delays between the base station MeNB and the RRHs are so small that the transmission delays are ignorable, and it is deemed that the data exchange between the MeNB and the RRHs is completed instantaneously.

Figure 6:
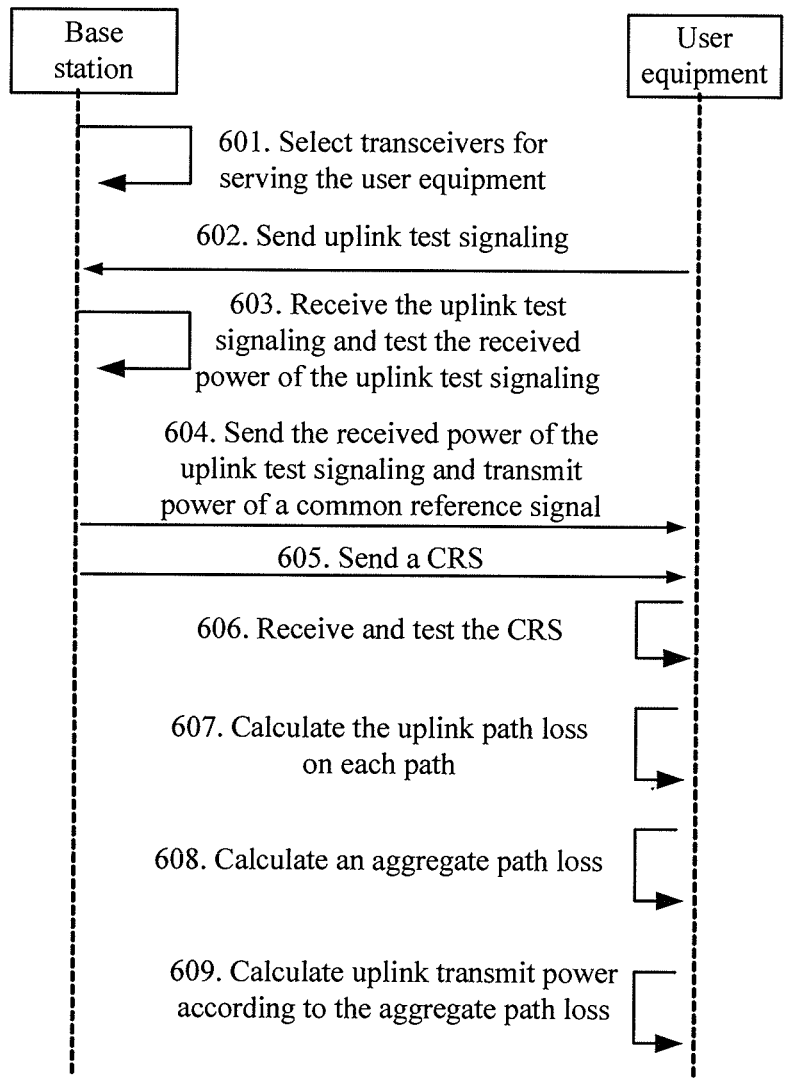
FIG. 6 is a schematic flowchart of interaction between a base station and a user equipment according to an embodiment of the present invention.

For the interaction process between the base station and the user equipment, reference may be made to FIG. 6.

601. A base station selects transceivers for serving a user equipment.

In FIG. 5, to describe the universal applicability of the embodiment of the present invention, it is assumed that the base station selects N transceivers for serving the user equipment, where the selected transceivers are MeNB-1, RRH-2, . . . , and RRH-N respectively. Specifically, the base station may, according to the measurement report of the user equipment, select MeNB-1, RRH-2, . . . , and RRH-N for serving the user equipment.

602. The user equipment sends uplink test signaling to the transceivers selected by the base station for serving the user equipment.

For example, the user equipment sends PRACH signaling to the selected MeNB-1, RRH-2, . . . , and RRH-N respectively.

603. The base station receives uplink test signaling sent by the user equipment, and tests receive power of the uplink test signaling received by the selected transceivers.

The base station receives the uplink test signaling sent by the user equipment, and respectively tests the receive power of the uplink test signaling received by MeNB-1, RRH-2, . . . , and RRH-N. The receive power of the uplink test signaling is: $P\_{rev1}, P\_{rev2}, \ldots, P\_{revN}$, where $P\_{rev1}$ is the receive power of the selected MeNB-1, $P\_{rev2}$ is the receive power of the selected RRH-2, . . . , and $P\_{revN}$ is the receive power of the selected RRH-N.

604. The base station sends the receive power of the uplink test signaling received by the selected transceivers and the transmit power of the common reference signal to the user equipment.

The base station sends $P\_{rev1}, P\_{rev2}, \ldots, P\_{revN}$ as the receive power of the uplink test signaling to the user equipment, and sends the transmit power of the common reference signal CRS, which is sent by the selected transceivers respectively, to the user equipment, where the transmit power of the common reference signal CRS sent by MeNB-1, RRH-2, . . . , and RRH-N respectively is known to each base station or RRH, and is $P\_{trs1}, P\_{trs2}, \ldots, P\_{trsN}$ respectively, where $P\_{trs1}$ is the transmit power of the CRS sent by MeNB-1, and $P\_{trsN}$ is the transmit power of the CRS sent by the RRH-N.

605. The base station sends the CRS to the user equipment.

MeNB-1, RRH-2, . . . , and RRH-N send the CRS to the user equipment respectively.

606. The user equipment receives and tests the CRS sent by the selected transceivers to obtain receive power of the reference signal.

The user equipment tests the CRS sent by MeNB-1, RRH-2, . . . , and RRH-N respectively to obtain receive power of the reference signal $P\_{DL0}$.

607. The user equipment calculates uplink path losses on paths between the user equipment and the selected transceivers according to the receive power of the uplink test signaling, the transmit power of the common reference signal, and the receive power of the reference signal.

By calculating the ratio of receive power $P\_{rev1}, P\_{rev2}, \ldots, P\_{revN}$ of the uplink test signaling, the user equipment calculates (N−1) first relative ratios in total, as shown in the following expression (1):

$$\begin{cases} P_{\_rev1}/P_{\_rev2} = a1 \\ P_{\_rev2}/P_{\_rev3} = a2 \\ \ldots \\ P_{\_rev(N-1)}/P_{\_revN} = aN \end{cases}$$

where, a1, a2, . . . aN are (N−1) first relative ratios calculated.

It is assumed that the uplink path losses on paths between the user equipment and the selected transceivers is $PL\_{UL1}$, $PL\_{UL2}$, . . . , $PL\_{ULN}$ respectively.

The transmit power of the uplink test signaling sent by the user equipment is a fixed value, assumed as $P_0$. Therefore, the following expression (2) is obtained:

$$\begin{cases} P_0 * PL\_{UL1} = P_{\_rev1} \\ P_0 * PL\_{UL2} = P_{\_rev2} \\ \ldots \\ P_0 * PL\_{ULN} = P_{\_revN} \end{cases}$$

Each equation in expression (1) and expression (2) is divided by a next equation to obtain the following expression (3):

$$\begin{cases} PL\_{UL1}/PL\_{UL2} = a1 \\ PL\_{UL2}/PL\_{UL3} = a2 \\ \ldots \\ PL\_{UL(N-1)}/PL\_{ULN} = aN \end{cases}$$

In expression (3), a1, a2, . . . , aN are (N−1) second relative ratios, where the second relative ratio is a ratio of the uplink path loss on a path between the user equipment and any transceiver in the selected N transceivers to the uplink path loss on a path between the user equipment and another transceiver in the selected transceivers.

According to the principle of reciprocity of an uplink and a downlink, it is assumed that the downlink path losses on paths between the user equipment and the selected transceivers are $PL\_{DL1}$, $PL\_{DL2}$, . . . , $PL\_{DLN}$ respectively.

Therefore, expression (3) may be used to deduce the following expression (4):

$$\begin{cases} PL\_{DL1}/PL\_{DL2} = a1 \\ PL\_{DL2}/PL\_{DL3} = a2 \\ \ldots \\ PL\_{DL(N-1)}/PL\_{DLN} = aN \end{cases}$$

The user equipment tests the CRS sent by MeND-1, RRH-2, . . . , and RRH-N respectively to obtain reference signal power $P\_{DL0}$. The transmit power of the common reference signal may be used to deduce the following expression (5):

$$P_{\_trs1} \cdot PL\_{DL1} + P_{\_trs2} \cdot PL\_{DL2} + \ldots + P_{\_trsN} \cdot PL\_{DLN} = P\_{DL0}$$

According to the principle of reciprocity of an uplink and a downlink, expression (5) may be used to deduce the following expression (6):

$$P_{\_trs1} \cdot PL\_{UL1} + P_{\_trs2} \cdot PL\_{UL2} + \ldots + P_{\_trsN} \cdot PL\_{ULN} = P\_{DL0}$$

Expression (3) and expression (6) may be used to deduce the following expression (7):

$$\begin{cases} PL\_{UL1}/PL\_{UL2} = a1 \\ PL\_{UL2}/PL\_{UL3} = a2 \\ \ldots \\ PL\_{UL(N-1)}/PL\_{ULN} = aN \\ P_{\_trs1} \cdot PL\_{UL1} + P_{\_trs2} \cdot PL\_{UL2} + \ldots + P_{\_trsN} \cdot PL\_{ULN} = P\_{DL0} \end{cases}$$

The uplink path losses on paths between the user equipment and the selected transceivers is calculated according to the receive power of the reference signal, the (N−1) second relative ratios, and the transmit power of the common reference signal. Specifically, the values of $PL\_{UL1}$, $PL\_{UL2}$, . . . , $PL\_{ULN}$ may be obtained according to expression (7). Because expression (7) includes N unknown numbers and N equations, the equations may be solved to obtain the specific values of $PL\_{UL1}$, $PL\_{UL2}$, . . . , $PL\_{ULN}$.

608. The user equipment calculates an aggregate path loss according to the uplink path losses on paths between the user equipment and the selected transceivers.

According to an aggregation algorithm, the aggregate path loss $PL_C$ is obtained by expression (8):

$$PL_C = W_1 * PL\_{UL1} + W_2 * PL\_{UL2} + \ldots + W_N * PL\_{ULN}$$

where $PL\_{UL1}$, $PL\_{UL2}$, . . . , $PL\_{ULN}$ are the uplink path losses on paths between the user equipment and the selected N transceivers, as calculated in 607. $W_1, W_2, \ldots, W_N$ are weighting factors of the uplink path losses on paths between the user equipment and the selected N transceivers.

It should be noted that $W_1, W_2, \ldots, W_N$ are weighting factors of the uplink path loss, and the values of the weighting factors may be decided by the user equipment. In a feasible implementation manner, mathematical expectation may be applied, that is, $W_1 + W_2 + \ldots + W_N = 1$, and $1 > W_1, W_2, \ldots, W_N >= 0$, and the $W_1, W_2, \ldots, W_N$ are set to specific values that satisfy such conditions. Alternatively, according to a principle of maximizing the uplink channel capacity, multiple combinations of $W_1, W_2, \ldots, W_N$ are preset, and $1 > W_1, W_2, \ldots, W_N >= 0$. According to a Shannon formula, the uplink channel capacity of each combination of $W_1, W_2, \ldots, W_N$ is calculated, and the values of $W_1, W_2, \ldots, W_N$ that accomplish the maximum uplink channel capacity are obtained. The method of calculating the uplink channel capacity according to a Shannon formula is covered in the prior art, and is not detailed herein. In addition, the same weighting factor may be applied. That is, $W_1, W_2, \ldots, W_N$ are all set to 1. Therefore, the aggregate path loss $PL_C$ may be simplified as $PL_C = PL\_{UL1} + PL\_{UL2} + \ldots + PL\_{ULN}$. Alternatively, the maximum value of the uplink path loss on all paths is used as an aggregate path loss $PL_C$. Therefore, $PL_C = \text{MAX}(PL\_{UL1}, PL\_{UL2}, \ldots, PL\_{ULN})$. Alternatively, the uplink path losses on all paths undergo a nonlinear operation, and a result of the nonlinear operation is used as an aggregate path loss $PL_C$. For example, $$PL_C = \frac{1}{1/PL\_{UL1} + 1/PL\_{UL2} + \ldots + 1/PL\_{ULN}}$$

609. The user equipment calculates uplink transmit power according to the aggregate path loss.

After the aggregate path loss is calculated by performing section 608, the user equipment may calculate uplink transmit power according to the aggregate path loss.

In the LTE Release-10 standard, the transmit power of a PUSCH mode, a PUCCH mode, or an SRS mode used by the user equipment is decided by the aggregate path loss PLc calculated by the user equipment side.

When the user equipment uses the uplink transmit power of a PUSCH mode to perform uplink power control, the following expression (9) is applied:

$$P_{PUSCH}(i) = \min \begin{Bmatrix} P_{CMAX}, \\ 10\log_{10}(M_{PUSCH}(i)) + P_{O\_PUSCH}(j) + \\ \alpha(j) \cdot PL_C + \Delta_{TF}(i) + f(i) \end{Bmatrix}$$

where, i represents a subframe, j represents a type of a data packet in a cell, $P_{CMAX}$ represents maximum allowable power, $M_{PUSCH}(i)$ is a PUSCH transmission bandwidth, $P_{O\_PUSCH}(j)$ is nominal power set by the base station for all UEs in the cell in a semi-static way, $\alpha(j)$ is a path loss compensation factor, $PL_c$ is an aggregate path loss, $\Delta_{TF}(i)$ is a power offset based on a modulation-coding mode and a data type, and f (i) represents a closed-loop adjustment part of power control.

In the expression above, $\alpha(j) \cdot PL_C$ needs to be defined by the following expression (10):

$$\alpha(j) \cdot PL_C = \alpha_1 * W_1 * PL\_{UL1} + \alpha_2 * W_2 * PL\_{UL2} + \ldots + \alpha_N * W_N * PL\_{ULN}$$

When the user equipment uses the uplink transmit power of a PUCCH mode to perform uplink power control, the following expression (11) is applied:

$$P_{PUCCH}(i) = \min \begin{Bmatrix} P_{CMAX}, \\ P_{0\_PUCCH} + PL_C + h(n_{CQI}, n_{HARQ}, n_{SR}) + \\ \Delta_{F\_PUCCH}(F) + \Delta_{TxD}(F') + g(i) \end{Bmatrix}$$

where, i represents a subframe, $P_{CMAX}$ represents maximum allowable power, $P_{O\_PUSCH}(j)$ is nominal power set by the base station for all UEs in the cell in a semi-static way, $PL_c$ is an aggregate path loss, $n_{CQI}$ is the number of bits of channel quality information, $n_{HARQ}$ is the number of bits of a hybrid automatic repeat request, $n_{SR}$ is the number of bits of a scheduling request, $h(n_{CQI}, n_{HARQ}, n_{SR})$ is a value based on a PUCCH format, F and F' are PUCCH formats, $\Delta_{F\_PUCCH}(F)$ is a relative value between the PUCCH format F and the PUCCH format 1a, $\Delta_{TxD}(F')$ is a value for transmitting a PUCCH on two antenna ports, and g (i) is a PUCCH power control adjustment state factor.

When the user equipment uses the uplink transmit power of an SRS mode to perform uplink power control, the following expression (12) is applied:

$$P_{SRS}(i) = \min \begin{Bmatrix} P_{CMAX}, \\ P_{SRS\_OFFSET} + 10\log_{10}(M_{SRS}) + \\ P_{O\_PUSCH}(j) + \alpha(j) \cdot PL_C f(i) \end{Bmatrix}$$

where, i represents a subframe, $P_{CMAX}$ represents maximum allowable power, $P_{SRS\_OFFSET}$ represents an offset of transmit power of an SRS, $M_{SRS}$ represents an SRS bandwidth, $P_{O\_PUSCH}(j)$ represents nominal power set by the base station for all UEs in the cell in a semi-static way, $\alpha(j)$ is a path loss compensation factor, $PL_c$ is an aggregate path loss, and f (i) represents a closed-loop adjustment part of power control.

Figure 7:
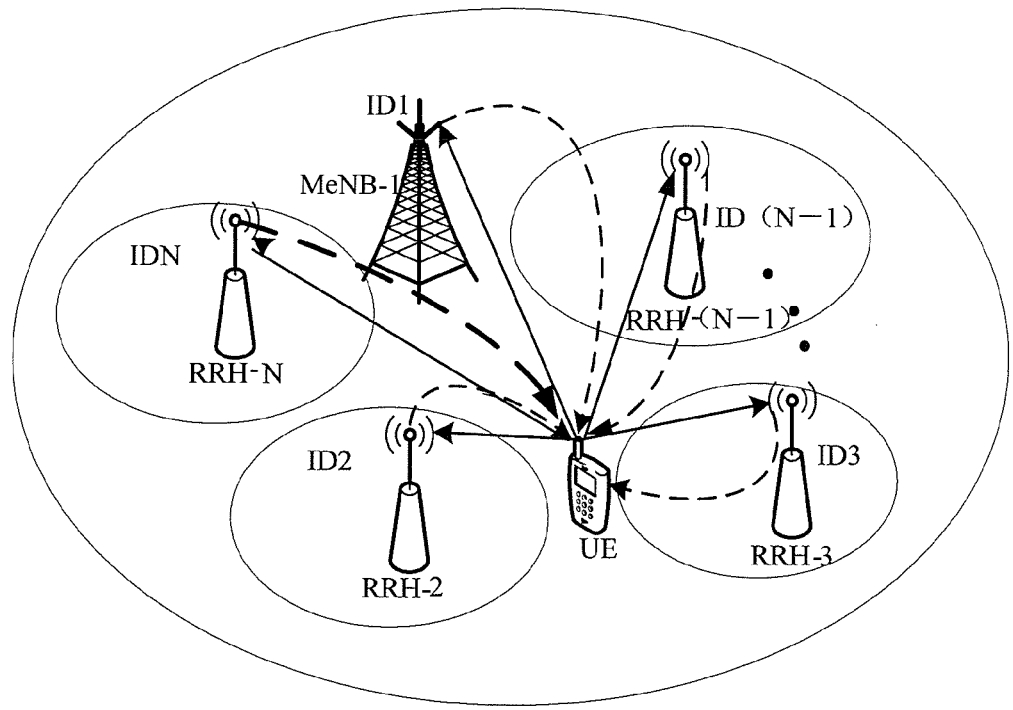
FIG. 7 is a schematic architecture diagram of joint communication of a base station and RRHs in another heterogeneous network according to an embodiment of the present invention.

It should be noted that the embodiment of the present invention is not only applicable to a communication system in a scenario of CoMP solution 4 in which a cell identity is shared, but also applicable to multiple application scenarios, for example, a communication system in a scenario of CoMP solution 3 in which respective cell identities are used independently. As shown in FIG. 7, MeNB-1, RRH-2, . . . , and RRH-N use respective cell identities independently. In such an application scenario, the specific interaction process between the base station and the user equipment is the same as that shown in FIG. 6, and is not detailed herein.

Figure 8:
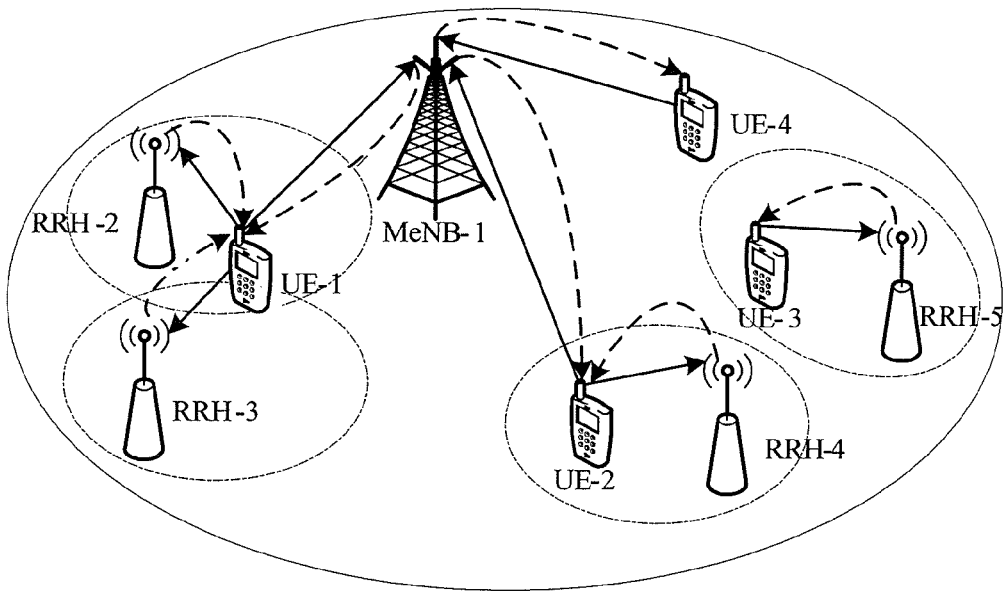
FIG. 8 is a schematic architecture diagram of joint communication of a base station and RRHs in another heterogeneous network according to an embodiment of the present invention.

As shown in FIG. 8, MeNB-1, RRH-2, . . . , and RRH-N cover the entire macro cell, and multiple scenarios may be included. Scenario 1: The antenna of MeNB-1, the antenna of RRH-2, and the antenna of RRH-3 all serve UE-1, and may make up an enhanced downlink or uplink MIMO system. Scenario 1: Both the antenna of MeNB-1 and the antenna of RRH-4 serve UE-2, and make up an enhanced downlink or uplink MIMO system. Scenario 3: The antenna of RRH-5 serves UE-3 and makes up a downlink or uplink MIMO system. Scenario 4: The antenna of MeNB-1 and the antenna of UE-4 make up a downlink or uplink MIMO system. In the four application scenarios, the antenna of the RRH and the antenna of the MeNB make up a downlink or uplink MIMO system. The use of the RRH improves conditions of the channel between the RRH and the UE, and improves MIMO performance. In each scenario in FIG. 8, uplink power control may be performed according to the interaction process between the base station and the user equipment as shown in FIG. 6, which is not detailed herein.

Figure 9:
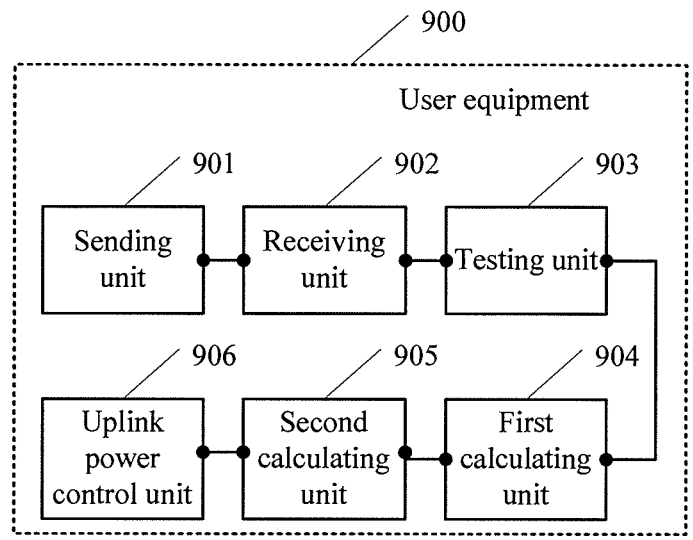
FIG. 9 is a schematic diagram of a user equipment according to an embodiment of the present invention.

The above embodiments respectively describe the uplink power control method. The following describes corresponding apparatuses for using the method. Referring to FIG. 9, a user equipment 900 provided in an embodiment of the present invention includes:

a sending unit 901, configured to send uplink test signaling to transceivers selected by a base station for serving the user equipment, so that the transceivers calculate receive power of the uplink test signaling by testing the uplink test signaling;

a receiving unit 902, configured to receive the receive power of the uplink test signaling and transmit power of a common reference signal from the selected transceivers, where the transmit power of the common reference signal is transmit power of a common reference signal CRS sent by the transceivers to the user equipment;

a testing unit 903, configured to receive and test the CRS sent by the selected transceivers to obtain receive power of the reference signal;

a first calculating unit 904, configured to calculate uplink path losses on paths between the user equipment and the selected transceivers according to the receive power of the uplink test signaling, the transmit power of the common reference signal, and the receive power of the reference signal;

a second calculating unit 905, configured to calculate an aggregate path loss according to the uplink path losses on paths between the user equipment and the selected transceivers; and an uplink power control unit 906, configured to calculate uplink transmit power according to the aggregate path loss.

In actual applications, a feasible implementation manner is: The sending unit 901 is specifically configured to send PRACH signaling to the transceivers selected by the base station for serving the user equipment; or the sending unit 901 is specifically configured to send A-SRS signaling to the transceivers selected by the base station for serving the user equipment.

In a specific application scenario, the sending unit 901 and the receiving unit 902 may be specifically an interface configured to exchange data or signaling with the base station side; the testing unit 903, the first calculating unit 904, the second calculating unit 905, and the uplink power control unit 906 may be specifically different processors configured to process different data respectively.

In actual applications, a feasible implementation manner is: The testing unit 903 is specifically configured to receive, through port 0 or port 1, the CRS sent by the selected transceivers and test the CRS to obtain receive power of the reference signal.

In actual applications, a feasible implementation manner is: The first calculating unit 904 includes (not illustrated in FIG. 9):

a first calculating module, configured to calculate (N−1) first relative ratios, where the first relative ratio is a ratio of the receive power of the uplink test signaling received by any transceiver in the transceivers to the receive power of the uplink test signaling received by another transceiver in the transceivers, and N is the number of transceivers and is a natural number greater than 1;

a second calculating module, configured to calculate (N−1) second relative ratios according to the (N−1) first relative ratios, where the second relative ratio is a ratio of the uplink path loss on a path between the user equipment and any transceiver in the transceivers to the uplink path loss on a path between the user equipment and another transceiver in the transceivers; and a third calculating module, configured to calculate the uplink path losses on paths between the user equipment and the selected transceivers according to the receive power of the reference signal, the (N−1) second relative ratios, and the transmit power of the common reference signal.

The third calculating module may calculate the uplink path losses on paths between the user equipment and the selected transceivers in the following way:

$$\begin{cases} PL\_{UL1} / PL\_{UL2} = a1 \\ PL\_{UL2} / PL\_{UL3} = a2 \\ \dots \\ PL\_{UL(N-1)} / PL\_{ULN} = aN \\ P\_{trs1} \cdot PL\_{UL1} + P\_{trs2} \cdot PL\_{UL2} + \dots + P\_{trsN} \cdot PL\_{ULN} = P\_{DL0} \end{cases}$$

where, $P\_{DL0}$ is the reference signal receive power obtained by the testing unit by testing the CRS sent by the selected transceivers, $P\_{trs1}, P\_{trs2}, \dots, P\_{trsN}$ are transmit power, received by the receiving unit, of the CRS sent by the N transceivers respectively, $PL\_{UL1}, PL\_{UL2}, \dots, PL\_{ULN}$ are the uplink path losses on paths between the user equipment and the selected N transceivers, $a1, a2, \dots, aN$ are second relative ratios of the uplink path loss on a path between the user equipment and any transceiver in the selected N transceivers to the uplink path loss on a path between the user equipment and another transceiver in the selected transceivers, which are calculated by the second calculating module, and $a1, a2, \dots$, are obtained in the following way:

$$\begin{cases} PL\_{rev1} / PL\_{rev2} = a1 \\ PL\_{rev2} / PL\_{rev3} = a2 \\ \dots \\ PL\_{rev(N-1)} / PL\_{revN} = aN \end{cases}$$

where, $P\_{rev1}, P\_{rev2}, \dots, P\_{revN}$ are receive power, received by the receiving unit, of the uplink test signaling received by the N transceivers respectively.

In actual applications, a feasible implementation manner is: The second calculating unit 905 calculates an aggregate path loss in the following way:

$$PL_C = W_1 * PL\_{UL1} + W_2 * PL\_{UL2} + \dots + W_N * PL\_{ULN}$$

or, $$PL_C = \mathrm{MAX}(PL\_{UL1}, PL\_{UL2}, \dots, PL\_{ULN})$$

or, $$PL_C = \frac{1}{1/PL\_{UL1} + 1/PL\_{UL2} + \dots + 1/PL\_{ULN}}$$

where, $PL_C$ is an aggregate path loss, $PL\_{UL1}, PL\_{UL2}, \dots, PL\_{ULN}$ are uplink path losses on each path between the user equipment and the selected N transceivers, which are calculated by the third calculating module, and $W_1, W_2, \dots, W_N$ are weighting factors of the uplink path losses on paths between the user equipment and the selected N transceivers. The values of the weighting factors of the uplink path loss may be decided by the user equipment. In a feasible implementation manner, mathematical expectation may be applied, that is, $W_1+W_2+\dots+W_N=1$ and $1>W_1, W_2, \dots, W_N>=0$, and $W_1, W_2, \dots, W_N$ are set to specific values that satisfy such conditions. Alternatively, according to a principle of maximizing the uplink channel capacity, multiple combinations of $W_1, W_2, \dots, W_N$ are preset, and $1>W_1, W_2, \dots, W_N>=0$. According to a Shannon formula, the uplink channel capacity of each combination of $W_1, W_2, \dots, W_N$ is calculated, and the values of $W_1, W_2, \dots, W_N$ that accomplish the maximum uplink channel capacity are obtained. The method of calculating the uplink channel capacity according to a Shannon formula is covered in the prior art, and is not detailed herein. In addition, the same weighting factor may be applied. That is, $W_1, W_2, \dots, W_N$ are all set to 1. Therefore, the aggregate path loss $PL_C$ may be simplified as $PL_C=PL\_{UL1}+PL\_{UL2}+\dots+PL\_{ULN}$.

The above embodiments describe only the structural relationships between units or modules. For the implementation method of each unit or module in actual applications, reference may be made to the methods illustrated in FIG. 1 and FIG. 6, which is not detailed herein.

In the embodiment of the present invention, a user equipment sends uplink test signaling to transceivers selected by a base station for serving the user equipment; the user equipment may receive power of the uplink test signaling and transmit power of a common reference signal from the transceivers; and then the user equipment receives and tests the common reference signal sent by the transceivers to obtain receive power of the reference signal, calculates an uplink path losses on paths between the user equipment and the selected transceivers according to the receive power of the uplink test signaling, the transmit power of the common reference signal, and the receive power of the reference signal, calculates an aggregate path loss according to the uplink path loss, and finally is capable of calculating uplink transmit power according to the aggregate path loss. Because the uplink path losses on paths between the user equipment and the selected transceivers is used for calculating the aggregate path loss, the user equipment can calculate the uplink transmit power more precisely. Because the transceivers for serving the user equipment may be selected by the base station, transceivers engaged in uplink joint reception can be supported flexibly, and the user equipment can calculate the uplink transmit power more precisely.

Figure 10:
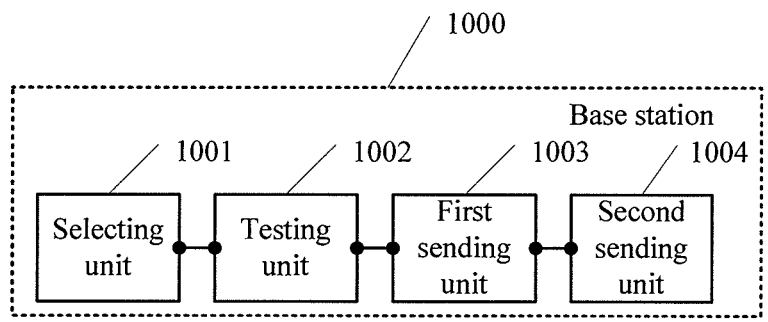
FIG. 10 is a schematic diagram of a base station according to an embodiment of the present invention.

The above embodiment describes the user equipment for implementing an uplink power control method, and the following describes a base station for implementing an uplink power control method. As shown in FIG. 10, the base station 1000 includes:

a selecting unit 1001, configured to select transceivers for serving a user equipment UE;

a testing unit 1002, configured to receive uplink test signaling sent by the user equipment, and test receive power of the uplink test signaling received by the selected transceivers;

a first sending unit 1003, configured to send the receive power of the uplink test signaling and transmit power of a common reference signal to the user equipment, where the transmit power of the common reference signal is transmit power of a common reference signal CRS sent by the transceivers to the user equipment; and a second sending unit 1004, configured to send the CRS to the user equipment.

In actual applications, a feasible implementation manner is: The first sending unit 1003 is specifically configured to use RRC signaling to send the receive power of the uplink test signaling received by the selected transceivers and the transmit power of the common reference signal to the user equipment; and the second sending unit 1004 is specifically configured to send the CRS to the user equipment through port 0 or port 1.

In actual applications, a feasible implementation manner is: The selecting unit 1001 is specifically configured to select transceivers that share a same cell identity to serve the user equipment; or, the selecting unit 1001 is specifically configured to select transceivers that use respective cell identities independently to serve the user equipment.

In actual applications, a feasible implementation manner is: The selecting unit 1001 is specifically configured to select base stations or RRHs as transceivers for serving the user equipment.

To reduce the processing load of the user equipment, the first sending unit 1003 may specifically include (not illustrated in FIG. 10):

a first calculating module, configured to calculate (N−1) first relative ratios, where the first relative ratio is a ratio of the receive power of the uplink test signaling received by any transceiver in the selected transceivers to the receive power of the uplink test signaling received by another transceiver in the selected transceivers, and N is the number of selected transceivers and is a natural number greater than 1;

a second calculating module, configured to calculate (N−1) second relative ratios according to the (N−1) first relative ratios, where the second relative ratio is a ratio of the uplink path loss on a path between the user equipment and any transceiver in the selected transceivers to the uplink path loss on a path between the user equipment and another transceiver in the selected transceivers; and a sending module, configured to send the (N−1) second relative ratios and the transmit power of the common reference signal to the user equipment.

It should be noted that as information exchange between modules/units of the foregoing apparatus, the implementation process thereof, and other content are based on the same conception as the method embodiments of the present invention, they bring the same technical effects as the method embodiments of the present invention. For specific content, reference may be made to the description in the method embodiments shown in FIG. 3 and FIG. 6, no repeated description is given herein.

In a practical application scenario, the selecting unit 1001 and the testing unit 1002 may be different processors configured to process different data; the first sending unit 1003 and the second sending unit 1004 may be specifically a processor and an interface, configured to interact with the user equipment and send data respectively.

In the embodiment of the present invention, the base station selects transceivers for serving the user equipment, and then the base station sends the receive power of the uplink test signaling received by the selected transceivers and the transmit power of the common reference signal to the user equipment, and finally, the selected transceivers send the CRS to the user equipment. The user equipment may receive and test the common reference signal to obtain receive power of the reference signal; the user equipment may calculate uplink path losses on paths between the user equipment and the selected transceivers according to the receive power of the uplink test signaling, the transmit power of the common reference signal, and the receive power of the reference signal, calculate an aggregate path loss according to the uplink path loss, and calculate uplink transmit power according to the aggregate path loss. Because the uplink path losses on paths between the user equipment and the selected transceivers is used for calculating the aggregate path loss, the user equipment can calculate the uplink transmit power more precisely. Because the transceivers for serving the user equipment may be selected by the base station, transceivers engaged in uplink joint reception can be supported flexibly, and the user equipment can calculate the uplink transmit power more precisely.

Figure 11:
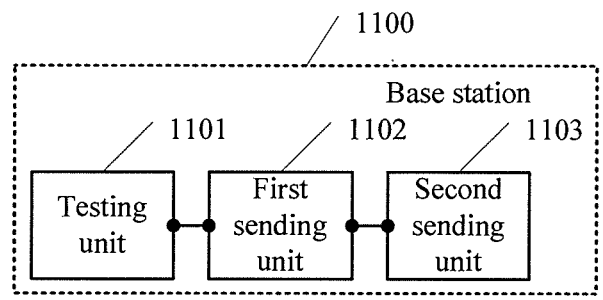
FIG. 11 is a schematic diagram of another base station according to an embodiment of the present invention.

The following describes a transceiver selected for serving a user equipment. The transceiver may be specifically a base station or an RRH. When the transceiver is a selected base station, FIG. 11 shows how the selected base station interacts with the user equipment; when the transceiver is a selected RRH, the interaction with the user equipment may be implemented in the same way as that illustrated in FIG. 11.

The base station 1100 selected for serving the user equipment includes:

a testing unit 1101, configured to receive uplink test signaling sent by the user equipment, and test receive power of the uplink test signaling received by the base station;

a first sending unit 1102, configured to send the receive power of the uplink test signaling and transmit power of a common reference signal to the user equipment, where the transmit power of the common reference signal is transmit power of the common reference signal sent by the base station 1100 to the user equipment; and a second sending unit 1103, configured to send the CRS to the user equipment.

In actual applications, a feasible implementation manner is: The first sending unit 1102 is specifically configured to use RRC signaling to send the receive power of the uplink test signaling received by the selected transceiver and the transmit power of the common reference signal to the user equipment, and the second sending unit 1103 is specifically configured to send the CRS to the user equipment through port 0 or port 1.

To reduce the processing load of the user equipment, the first sending unit 1102 may specifically include (not illustrated in FIG. 11):

a first calculating module, configured to calculate (N−1) first relative ratios, where the first relative ratio is a ratio of the receive power of the uplink test signaling received by any transceiver in the selected transceivers to the receive power of the uplink test signaling received by another transceiver in the selected transceivers, and N is the number of selected transceivers and is a natural number greater than 1;

a second calculating module, configured to calculate (N−1) second relative ratios according to the (N−1) first relative ratios, where the second relative ratio is a ratio of the uplink path loss on a path between the user equipment and any transceiver in the selected transceivers to the uplink path loss on a path between the user equipment and another transceiver in the selected transceivers; and a sending module, configured to send the (N−1) second relative ratios and the transmit power of the common reference signal to the user equipment.

Figure 4:
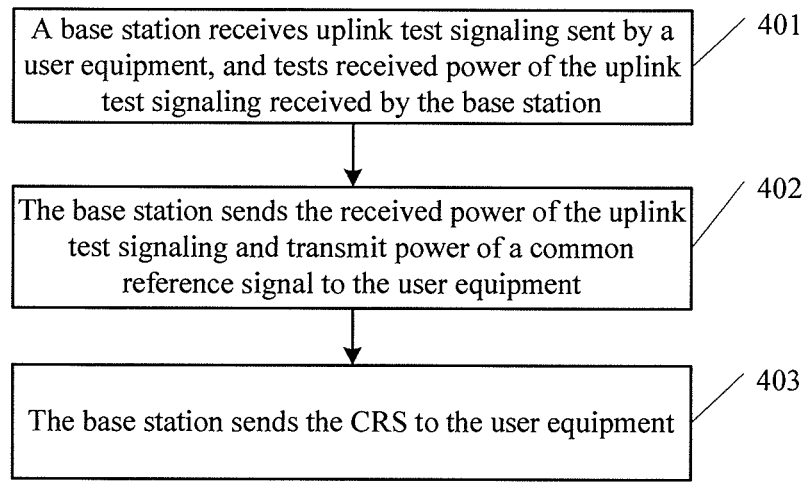
FIG. 4 is a schematic diagram of another uplink power control method according to an embodiment of the present invention.

It should be noted that as information exchange between modules/units of the foregoing apparatus, the implementation process thereof, and other content are based on the same conception as the method embodiments of the present invention, they bring the same technical effects as the method embodiments of the present invention, For specific content, reference may be made to the description in the method embodiments shown in FIG. 4 and FIG. 6, and no repeated description is given herein.

In a practical application scenario, the testing unit 1101 may be a processor configured to process different data; the first sending unit 1102 and the second sending unit 1103 may be specifically a processor and an interface configured to interact with the user equipment and send data respectively.

In the embodiment of the present invention, the base station sends the receive power of the uplink test signaling and transmit power of a common reference signal to the user equipment, and finally, sends the CRS to the user equipment. The user equipment may receive and test the common reference signal to obtain receive power of the reference signal; the user equipment may calculate uplink path losses on paths between the user equipment and the selected transceivers according to the receive power of the uplink test signaling, the transmit power of the common reference signal, and the receive power of the reference signal, calculate an aggregate path loss according to the uplink path loss, and calculate uplink transmit power according to the aggregate path loss. Because the uplink path losses on paths between the user equipment and the selected transceivers is used for calculating the aggregate path loss, the user equipment can calculate the uplink transmit power more precisely. Because the transceivers for serving the user equipment may be selected by the base station, transceivers engaged in uplink joint reception can be supported flexibly, and the user equipment can calculate the uplink transmit power more precisely.

Persons of ordinary skill in the art may understand that all or a part of the steps of the method in the embodiments may be implemented by a program instructing relevant hardware. The program may be stored in a computer readable storage medium. The storage medium may be a read-only memory, a magnetic disk, or an optical disk.

Detailed above are an uplink power control method, a base station, and a user equipment according to the present invention. Persons of ordinary skill in the art can make modifications to the specific implementation manners and the application scopes according to the ideas of the embodiments of the present invention. Therefore, the specification shall not be construed as a limitation to the present invention.

What is claimed is:

1. A method for controlling uplink power, the method comprising:
sending, by a user equipment, uplink test signaling to transceivers for serving the user equipment, so that the transceivers calculate a receive power of the uplink test signaling by testing the uplink test signaling;
receiving, by the user equipment, the receive power of the uplink test signaling and a transmit power of a common reference signal (CRS) from the transceivers, wherein the transmit power of the CRS is transmit power of a CRS sent by the transceivers to the user equipment;
receiving and testing, by the user equipment, the CRS sent by the transceivers to obtain a receive power of the CRS;
calculating, by the user equipment, uplink path losses on paths between the user equipment and the transceivers according to the receive power of the uplink test signaling, the transmit power of the CRS, and the receive power of the CRS;
calculating, by the user equipment, an aggregate path loss according to the uplink path losses on paths between the user equipment and the transceivers; and
calculating, by the user equipment, a uplink transmit power according to the aggregate path loss.

2. The uplink power control method according to claim 1, wherein calculating, by the user equipment, uplink path losses on paths between the user equipment and the transceivers according to the receive power of the uplink test signaling, the transmit power of the CRS, and the receive power of the CRS, comprises:
calculating, by the user equipment, (N−1) first relative ratios, wherein the first relative ratio is a ratio of the receive power of the uplink test signaling received by any transceiver in the transceivers to the receive power of the uplink test signaling received by another transceiver in the transceivers, and N is the number of transceivers and is a natural number greater than 1;
calculating, by the user equipment, (N−1) second relative ratios according to the (N−1) first relative ratios, wherein the second relative ratio is a ratio of the uplink path loss on a path between the user equipment and any transceiver in the transceivers to the uplink path loss on a path between the user equipment and another transceiver in the transceivers; and
calculating, by the user equipment, uplink path losses on paths between the user equipment and the transceivers according to the receive power of the CRS, the (N−1) second relative ratios, and the transmit power of the CRS.

3. The uplink power control method according to claim 2, wherein the user equipment calculates the uplink path losses on paths between the user equipment and the transceivers according to the receive power of the CRS, the (N−1) second relative ratios, and the transmit power of the CRS in the following way:

$$\begin{cases} PL\_{UL1}/PL\_{UL2} = a1 \\ PL\_{UL2}/PL\_{UL3} = a2 \\ ... \\ PL\_{UL(N-1)}/PL\_{ULN} = aN \\ P\_{trs1} \cdot PL\_{UL1} + P\_{trs2} \cdot PL\_{UL2} + ... + P\_{trsN} \cdot PL\_{ULN} = P\_{DL0} \end{cases}$$

wherein, $P\_{DL0}$ is receive power of the CRS obtained by the user equipment by testing the CRS sent by the transceivers, $P\_{trs1}, P\_{trs2}, \ldots, P\_{trsN}$ are transmit power of the N transceivers for sending the CRS respectively, $PL\_{UL1}, PL\_{UL2}, \ldots, PL\_{ULN}$ are the uplink path losses on paths between the user equipment and the N transceivers, $\alpha1, \alpha2, \ldots, \alpha N$ are second relative ratios of the uplink path loss on a path between the user equipment and any transceiver in the N transceivers to the uplink path loss on a path between the user equipment and another transceiver in the transceivers, and $\alpha1, \alpha2, \ldots, \alpha N$ are obtained in the following way:

$$\begin{cases} P\_{rev1}/P\_{rev2} = a1 \\ P\_{rev2}/P\_{rev3} = a2 \\ ... \\ P\_{rev(N-1)}/P\_{revN} = aN \end{cases}$$

wherein, $P\_{rev1}, P\_{rev2}, \ldots, P\_{revN}$ are receive power of the uplink test signaling received by the N transceivers respectively.

4. The uplink power control method according to claim 3, wherein the user equipment calculates the aggregate path loss according to the uplink path losses on paths between the user equipment and the transceivers in the following way:

$$PL_C = W_1 * PL\_{UL1} + W_2 * PL\_{UL2} + ... + W_N * PL\_{ULN}$$

or, $$PL_C = \text{MAX}(PL\_{UL1}, PL\_{UL2}, \ldots, PL\_{ULN})$$

or, $$PL_C = \frac{1}{1/PL\_{UL1} + 1/PL\_{UL2} + ... + 1/PL\_{ULN}}$$

wherein, $PL_C$ is the aggregate path loss, $PL\_{UL1}$, $PL\_{UL2}, \ldots, PL\_{ULN}$ are the uplink path losses on paths between the user equipment and the N transceivers, and $W_1, W_2, \ldots, W_N$ are weighting factors of the uplink path losses on paths between the user equipment and the N transceivers.

5. The uplink power control method according to claim 1, wherein the uplink test signaling comprises: physical random access channel (PRACH) signaling, or uplink aperiodic sounding reference signal (A-SRS) signaling.

6. The uplink power control method according to claim 1, wherein the transceivers are base stations, relays, or radio remote heads (RRHs).

7. An uplink power control method, comprising:
  selecting, by a base station, transceivers for serving a user equipment (UE);
  receiving, by the base station, uplink test signaling sent by the user equipment, and testing receive power of the uplink test signaling received by the selected transceivers;
  sending, by the base station, the receive power of the uplink test signaling and transmit power of a common reference signal (CRS) to the user equipment, including:
    calculating, by the base station, (N−1) first relative ratios, wherein the first relative ratio is a ratio of the receive power of the uplink test signaling received by any transceiver in the selected transceivers to the receive power of the uplink test signaling received by another transceiver in the selected transceivers, and N is the number of selected transceivers and is a natural number greater than 1;
    calculating, by the base station, (N−1) second relative ratios according to the (N−1) first relative ratios, wherein the second relative ratio is a ratio of the uplink path loss on a path between the user equipment and any transceiver in the selected transceivers to the uplink path loss on a path between the user equipment and another transceiver in the selected transceivers; and
    sending, by the base station, the (N−1) second relative ratios and the transmit power of the CRS to the user equipment, wherein the transmit power of the CRS is transmit power of a CRS sent by the transceivers to the user equipment; and
  sending, by the base station, the CRS to the user equipment.

8. The uplink power control method according to claim 7, wherein the base station sends the receive power of the uplink test signaling and the transmit power of the CRS to the user equipment by using radio resource control (RRC) protocol signaling.

9. The uplink power control method according to claim 7, wherein:
  the transceivers selected by the base station for serving the user equipment share a same cell identity;
  or,
  the transceivers selected by the base station for serving the user equipment use respective cell identities independently.

10. The uplink power control method according to claim 7, wherein the transceivers selected by the base station for serving the user equipment are base stations or radio remote heads (RRHs).

11. An uplink power control method, comprising:
  receiving, by a transceiver selected by a base station, uplink test signaling sent by a user equipment (UE), and testing receive power of the uplink test signaling received by the transceiver;
  sending, by the transceiver, the receive power of the uplink test signaling and transmit power of a common reference signal (CRS) to the user equipment, including:
    calculating, by the base station, (N−1) first relative ratios, wherein the first relative ratio is a ratio of the receive power of the uplink test signaling received by the transceiver to the receive power of the uplink test signaling received by another transceiver, and N is a number of selected transceivers and is a natural number greater than 1;
    calculating, by the base station, (N−1) second relative ratios according to the (N−1) first relative ratios, wherein the second relative ratio is a ratio of the uplink path loss on a path between the user equipment and the transceivers to the uplink path loss on a path between the user equipment and another transceiver; and sending, by the base station, the (N−1) second relative ratios and the transmit power of the CRS to the user equipment, wherein the transmit power of the CRS is transmit power of a CRS sent by the transceiver to the user equipment; and sending, by the transceiver, the CRS to the user equipment.

12. The uplink power control method according to claim 11, wherein the transceiver sends the receive power of the uplink test signaling and the transmit power of the CRS to the user equipment by using radio resource control (RRC) protocol signaling.

13. A user equipment, comprising:
a sending unit, configured to send uplink test signaling to transceivers for serving the user equipment, so that the transceivers calculate receive power of the uplink test signaling by testing the uplink test signaling;
a receiving unit, configured to receive the receive power of the uplink test signaling and transmit power of a common reference signal (CRS) from the transceivers, wherein the transmit power of the CRS is transmit power of a CRS sent by the transceivers to the user equipment;
a testing unit, configured to receive and test the CRS sent by the transceivers to obtain receive power of the CRS;
a first calculating unit, configured to calculate uplink path losses on paths between the user equipment and the transceivers according to the receive power of the uplink test signaling, the transmit power of the CRS, and the receive power of the CRS;
a second calculating unit, configured to calculate an aggregate path loss according to the uplink path losses on paths between the user equipment and the transceivers; and
an uplink power control unit, configured for the user equipment to calculate uplink transmit power according to the aggregate path loss.

14. The user equipment according to claim 13, wherein the first calculating unit comprises:
a first calculating module, configured to calculate (N−1) first relative ratios, wherein the first relative ratio is a ratio of the receive power of the uplink test signaling received by any transceiver in the transceivers to the receive power of the uplink test signaling received by another transceiver in the transceivers, and N is the number of transceivers and is a natural number greater than 1;
a second calculating module, configured to calculate (N−1) second relative ratios according to the (N−1) first relative ratios, wherein the second relative ratio is a ratio of the uplink path loss on a path between the user equipment and any transceiver in the transceivers to the uplink path loss on a path between the user equipment and another transceiver in the transceivers; and
a third calculating module, configured to calculate the uplink path losses on paths between the user equipment and the transceivers according to the receive power of the CRS, the (N−1) second relative ratios, and the transmit power of the CRS.

15. The user equipment according to claim 14, wherein the third calculating module calculates the uplink path losses on paths between the user equipment and the transceivers in the following way:

$$\begin{cases} PL\_{UL1}/PL\_{UL2} = a1 \\ PL\_{UL2}/PL\_{UL3} = a2 \\ \ldots \\ PL\_{UL(N-1)}/PL\_{ULN} = aN \\ P\_{trs1} \cdot PL\_{UL1} + P\_{trs2} \cdot PL\_{UL2} + \ldots + P\_{trsN} \cdot PL\_{ULN} = P\_{DL0} \end{cases}$$

wherein, $P\_{DL0}$ is receive power of the CRS obtained by the testing unit by testing the CRS sent by the transceivers, $P\_{trs1}, P\_{trs2}, \ldots, P\_{trsN}$ are transmit power of the N transceivers for sending the CRS respectively, $PL\_{UL1}, PL\_{UL2}, \ldots, PL\_{ULN}$ are the uplink path losses on paths between the user equipment and the N transceivers, $\alpha1, \alpha2, \ldots, \alpha N$ are second relative ratios of the uplink path loss on a path between the user equipment and any transceiver in the N transceivers to the uplink path loss on a path between the user equipment and another transceiver in the transceivers, which are calculated by the second calculating module, and $\alpha1, \alpha2, \ldots, \alpha N$ are obtained in the following way:

$$\begin{cases} P\_{rev1}/P\_{rev2} = a1 \\ P\_{rev2}/P\_{rev3} = a2 \\ \ldots \\ P\_{rev(N-1)}/P\_{revN} = aN \end{cases}$$

wherein, $P\_{rev1}, P\_{rev2}, \ldots, P\_{revN}$ are receive power, received by the receiving unit, of the uplink test signaling received by the N transceivers respectively.

16. The user equipment according to claim 15, wherein the second calculating unit calculates the aggregate path loss in the following way:

$$PL_C = W_1 * PL\_{UL1} + W_2 * PL\_{UL2} + \ldots + W_N * PL\_{ULN}$$

or, $$PL_C = \text{MAX}(PL\_{UL1}, PL\_{UL2}, \ldots, PL\_{ULN})$$

or, $$PL_C = \frac{1}{1/PL\_{UL1} + 1/PL\_{UL2} + \ldots + 1/PL\_{ULN}}$$

wherein, $PL_C$ is the aggregate path loss, $PL\_{UL1}, PL\_{UL2}, \ldots, PL\_{ULN}$ are the uplink path losses on paths between the user equipment and the N transceivers, and $W_1, W_2, \ldots, W_N$ are weighting factors of the uplink path losses on paths between the user equipment and the N transceivers.

17. The user equipment according to claim 16, wherein the sending unit is configured to send physical random access channel (PRACH) signaling or uplink aperiodic sounding reference signal (A-SRS) signaling to the transceivers for serving the user equipment.

18. A base station, comprising:
a selecting unit, configured to select transceivers for serving a user equipment (UE);
a testing unit, configured to receive uplink test signaling sent by the user equipment, and test receive power of the uplink test signaling received by the selected transceivers;

a first sending unit, configured to send the receive power of the uplink test signaling and transmit power of a common reference signal (CRS) to the user equipment, wherein the transmit power of the CRS is transmit power of a CRS sent by the transceiver to the user equipment, wherein the first sending unit comprises:
a first calculating module, configured to calculate (N−1) first relative ratios, wherein the first relative ratio is a ratio of the receive power of the uplink test signaling received by any transceiver in the selected transceivers to the receive power of the uplink test signaling received by another transceiver in the selected transceivers, and N is the number of selected transceivers and is a natural number greater than 1;
a second calculating module, configured to calculate (N−1) second relative ratios according to the (N−1) first relative ratios, wherein the second relative ratio is a ratio of the uplink path loss on a path between the user equipment and any transceiver in the selected transceivers to the uplink path loss on a path between the user equipment and another transceiver in the selected transceivers; and
a sending module, configured to send the (N−1) second relative ratios and the transmit power of the CRS to the user equipment; and
a second sending unit, configured to send the CRS to the user equipment.

19. The base station according to claim 18, wherein the first sending unit is configured to send the receive power of the uplink test signaling and the transmit power of the CRS to the user equipment by using radio resource control (RRC) protocol signaling.

20. The base station according to claim 18, wherein:
the selecting unit is configured to select transceivers that share a same cell identity to serve the user equipment; or,
the selecting unit is configured to select transceivers that use respective cell identities independently to serve the user equipment.

21. The base station according to claim 18, wherein the selecting unit is configured to select base stations, relays, or radio remote heads (RRHs) as transceivers for serving the user equipment.

22. A transceiver, wherein the transceiver is selected for serving a user equipment by a base station, and the transceiver comprises:
a testing unit, configured to receive uplink test signaling sent by the user equipment, and test receive power of the uplink test signaling received by the transceiver;
a first sending unit, configured to send the receive power of the uplink test signaling and transmit power of a common reference signal (CRS) to the user equipment, wherein the transmit power of the CRS is transmit power of a CRS sent by the transceiver to the user equipment, wherein the first sending unit comprises:
a first calculating module, configured to calculate (N−1) first relative ratios, wherein the first relative ratio is a ratio of the receive power of the uplink test signaling received by the transceiver to the receive power of the uplink test signaling received by another transceiver, and N is a number of selected transceivers and is a natural number greater than 1;
a second calculating module, configured to calculate (N−1) second relative ratios according to the (N−1) first relative ratios, wherein the second relative ratio is a ratio of the uplink path loss on a path between the user equipment and the transceiver to the uplink path loss on a path between the user equipment and another transceiver; and
a sending module, configured to send the (N−1) second relative ratios and the transmit power of the CRS to the user equipment; and
a second sending unit, configured to send the CRS to the user equipment.

23. The transceiver according to claim 22, wherein the first sending unit is configured to send the receive power of the uplink test signaling and the transmit power of the CRS to the user equipment by using radio resource control (RRC) protocol signaling.

* * * * *